US008719625B2

(12) United States Patent
Edmeades et al.

(10) Patent No.: US 8,719,625 B2
(45) Date of Patent: May 6, 2014

(54) METHOD, APPARATUS AND COMPUTER PROGRAM FOR PROCESSING INVALID DATA

(75) Inventors: Jason C. Edmeades, Chandlers Ford (GB); Peter J. Johnson, Chandlers Ford (GB); Clare J. Owens, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 13/164,903

(22) Filed: Jun. 21, 2011

(65) Prior Publication Data
US 2012/0023359 A1   Jan. 26, 2012

(30) Foreign Application Priority Data

Jul. 22, 2010 (EP) ..................................... 10170490

(51) Int. Cl.
*G06F 11/00* (2006.01)
(52) U.S. Cl.
USPC ............................................................ 714/11
(58) Field of Classification Search
USPC ............................................................ 714/11
See application file for complete search history.

(56) References Cited

U.S. PATENT DOCUMENTS

| | | | |
|---|---|---|---|
| 2004/0205124 A1* | 10/2004 | Limprecht et al. | 709/204 |
| 2004/0205781 A1* | 10/2004 | Hill et al. | 719/328 |
| 2005/0203673 A1* | 9/2005 | El-Hajj et al. | 701/1 |
| 2006/0218560 A1 | 9/2006 | Dadiomov et al. | |
| 2008/0229329 A1 | 9/2008 | Ayres et al. | |
| 2009/0240777 A1* | 9/2009 | De Meyer et al. | 709/206 |
| 2010/0192025 A1* | 7/2010 | Limprecht et al. | 714/48 |
| 2011/0276636 A1* | 11/2011 | Cheng et al. | 709/206 |

* cited by examiner

*Primary Examiner* — Scott Baderman
*Assistant Examiner* — Jigar Patel
(74) *Attorney, Agent, or Firm* — Winstead, P.C.

(57) ABSTRACT

A method, system and computer program for processing invalid data. Data is received at a shared component for processing. A shared component is a component that is capable of being shared by multiple entities. The shared component has a plurality of threads. An attempt is made to process the data using one of the threads from the plurality of threads. The data is invalid and therefore the attempt at processing the invalid data results in the shared component and its plurality of threads failing. In response to the failure of the shared component, at least two instances of the shared component are created. At least one thread is assigned to each component instance, where the number of threads assigned to each component instance is restricted to a maximum number that is less than the original number of the plurality of threads.

18 Claims, 3 Drawing Sheets

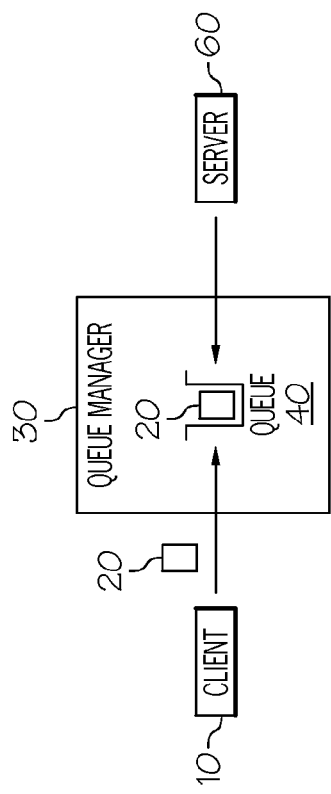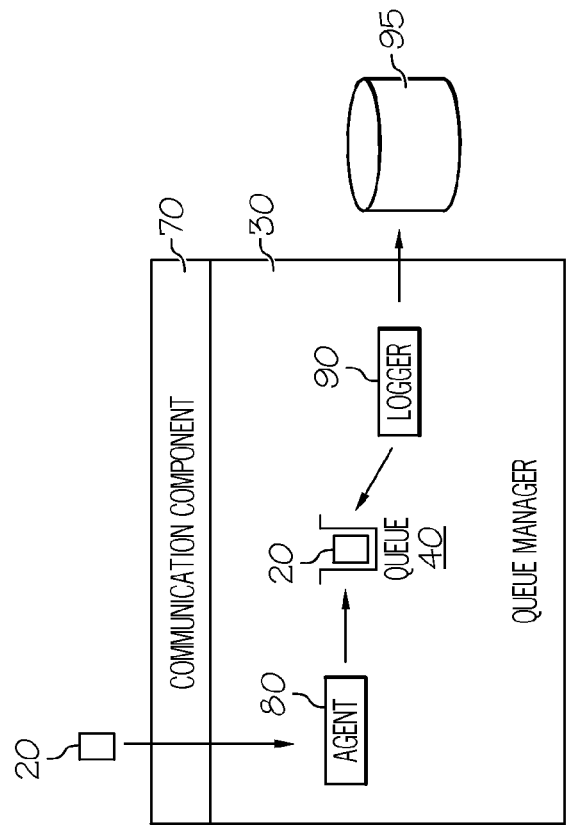

METHOD, APPARATUS AND COMPUTER PROGRAM FOR PROCESSING INVALID DATA

CROSS-REFERENCE TO RELATED APPLICATIONS

This application claims priority under 35 U.S.C. §119(a) from European Patent Application No. 10170490.6, filed on Jul. 22, 2010, the contents of which are incorporated herein by reference.

TECHNICAL FIELD

The present invention relates to the receipt of invalid data by a component that is shared by multiple entities. More particularly, the present invention relates to how a system deals with the receipt of such invalid data.

BACKGROUND

Messaging systems provide a way for heterogeneous machines to communicate with one another via one or more queues managed by a queue manager.

An exemplary system is shown in FIG. 1. Client 10 wishes to have server 60 perform some work on its behalf. Client 10 therefore puts a message 20 onto queue 40 managed by queue manager 30. Server 60 is listening on queue 40 and gets messages from the head of queue 40. Server 60 can thus perform the work requested by client 10 using message 20.

Currently, messaging systems can be vulnerable to malicious security attacks where a third party sends a message intended to cause the system to, at the very least, operate less efficiently; a so called "poison message." Messages which a system recognizes as invalid can be shelved off to a separate queue for further investigation. A poison message, in this instance, is a message which the receiving system does not recognize as problematic but which will typically cause a part of that system to fail.

Failure of a component is particularly problematic when that component is shared by multiple entities. An outage can result for such entities. Such exposures can be fixed by either programming the queue manager itself or an exit program to identify the signature of such poison messages and take action. Such solutions, however, require additional programming and can only be implemented once a component of the queue manager has failed and the problem investigated. This solution may also not be effective if the signature of the poison message is continually changing.

BRIEF SUMMARY

In one embodiment of the present invention, a method for processing invalid data comprises receiving data at a shared component for processing, the shared component having a plurality of threads. The method further comprises attempting to process the data using one thread from the plurality of threads, where the data is invalid and therefore the attempt at processing the invalid data results in the shared component and its plurality of threads failing. The method additionally comprises responsive to failure of the shared component, creating at least two instances of the shared component. In addition, the method comprises assigning, by a processor, at least one thread to each component instance, where a number of threads assigned to each component instance is restricted to a maximum number that is less than an original number of the plurality of threads.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 1 illustrates an exemplary messaging system;

FIG. 2 illustrates a queue manager in accordance with an embodiment of the present invention;

DETAILED DESCRIPTION

Figure 3:
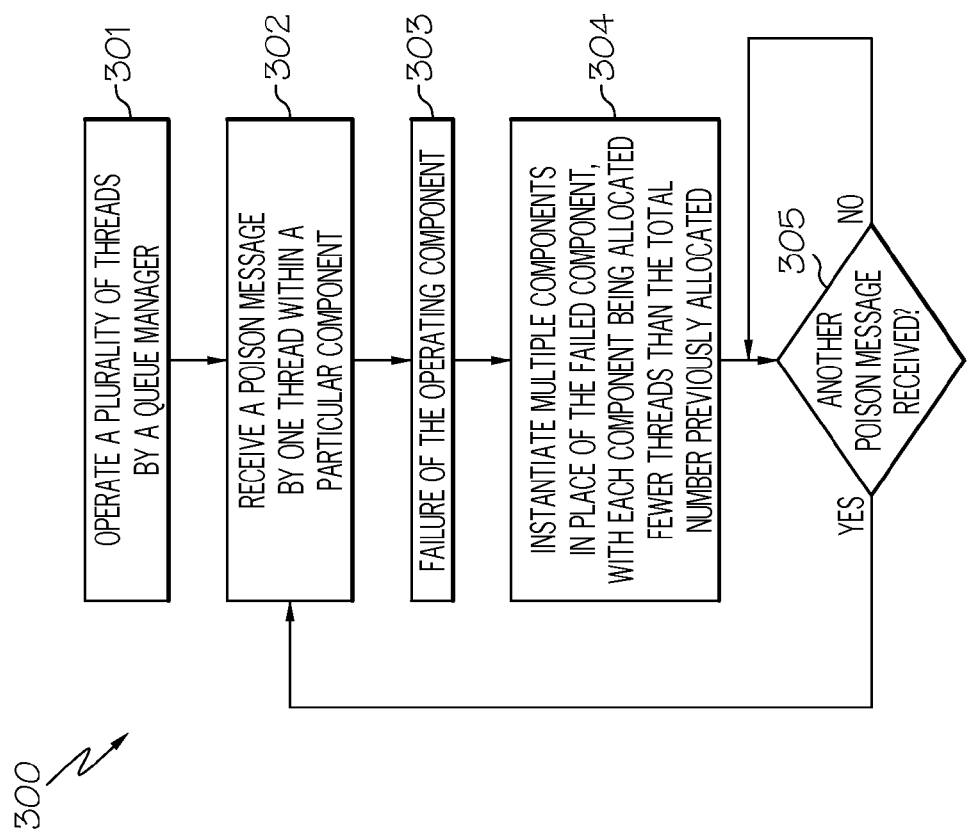
FIG. 3 is a flowchart of a method for processing invalid data in accordance with an embodiment of the present invention.

The present invention comprises a method, system and computer program product for processing invalid data. Data is received at a shared component for processing. A shared component is a component that is capable of being shared by multiple entities. The shared component has a plurality of threads. An attempt is made to process the data using one of the threads from the plurality of threads. The data is invalid and therefore the attempt at processing the invalid data results in the shared component and its plurality of threads failing. In response to the failure of the shared component, at least two instances of the shared component are created. At least one thread is assigned to each component instance, where the number of threads assigned to each component instance is restricted to a maximum number that is less than the original number of the plurality of threads.

A shared component is a component that is capable of being shared by multiple entities. For example, a queue manager may receive requests (to perform work) from multiple clients. In this example, an entity is a client (but it could equally be a server). There may be one or more connections from each entity to the queue manager.

It should be appreciated that the data may (by way of example) be a message comprising a header and a payload. Thus, the term data is not intended to imply the payload only.

The term "invalid" is merely intended to imply that the data triggers a problem when the shared component attempts to process that data.

In one embodiment, the number of threads assigned to each component instance is a proportion of the number of threads originally allocated to the failed component. In other words, if the total number of threads allocated was 10, then this number may (for example) be split in half between two newly instantiated components.

Rules may be used to determine how many instances of the shared component to create. Rules may also be used to determine the number of threads to assign to each component instance. According to one embodiment, there may come a time when it is not appropriate to create any new instances of a shared component.

In one embodiment, the shared component is a component of a queue manager in a messaging system.

A solution is disclosed which provides more isolation and recovery against malicious security attacks to messaging (and other) systems. The functionality disclosed enables, for example, queue managers to be more resilient to such malicious attacks.

FIG. 2 illustrates a queue manager 30 in more detail, in accordance with an embodiment of the present invention. The queue manager 30 comprises a number of components (processes). Some exemplary components are shown in FIG. 2, but these should by no means be seen as exhaustive. One such component is a communication component 70. Component 70 may comprise a number of threads (not shown). Each thread listens out for any new messages. When a new message 20 arrives at queue manager 30, one of these threads receives message 20 and passes it on to another component, agent 80. Agent 80 also typically comprises a number of threads and one of these threads will put message 20 onto queue 40. Another component, logger 90, may be listening on queue 40 in order to log a copy of the newly received message 20 to storage 95. Again, logger 90, also typically operates a plurality of threads.

Thus, each component preferably has a number of threads, enabling that component to be shared by multiple entities and to perform work in parallel. This means, for example, that a queue manager may receive requests from multiple clients and there may equally be multiple servers processing the work requested by those clients.

Previously, should one thread receive a malicious message, this could cause the whole component and thereby all of its threads to fail. In other words, the malicious message can cause an unhandled exception to occur on one thread. This will typically cause a system's operating system to stop all the other threads within that component. An unhandled exception occurs on a thread when during processing of a received message, an exception is thrown by the operating system which is not expected nor handled by the threads code (e.g., when the received message contains data which triggers a problem inside the thread).

Such a failure could thus affect multiple entities (i.e., the entities (e.g., clients) for which the failed threads were performing work). An unplanned component outage of this nature is very undesirable. In this example, the component most likely to be affected is the communication component 70. If this component 70 fails due to a malicious message, then the queue manager 30 will be unable to receive any messages and will effectively be inoperative. Naturally, other components may be taken out by a malicious message, but the communication component is the interface to the outside world and is thus the easiest component to attack.

There is a further problem, in that the sender of the malicious message may continue to send the same message or indeed send multiple similarly malicious messages, all designed to cause a system component to fail. Thus, simply restarting the failed component may not be enough.

FIG. 3 is a flowchart of a method 300 for processing invalid data in accordance with an embodiment of the present invention.

Referring to FIG. 3, in conjunction with FIG. 2, as previously discussed, in step 301, a queue manager 30 operates a plurality of threads responsible for performing its work. In step 302, one of these threads (within a component of the queue manager) receives a poison message which causes the receiving component to fail in step 303. In step 304, multiple versions of the failed component are then instantiated in place of the failing component in order to create component instances. Each of the new component instances is now allocated a number of threads which is less than the total number of threads initially allocated to the failed component. In an exemplary embodiment, the number of threads allocated to each new component instance is a proportion of the number of threads originally allocated to the failed component.

A component (not shown) within queue manager 30 is preferably responsible for instantiating new versions of a failed component.

The messaging system (e.g., the communication component) continues to listen for another poison message in step 305 whilst continuing to operate and process valid messages as usual. If another poison message is not received, then the messaging system (e.g., the communication component) continues to listen for another poison message in step 305. If, however, a poison message is received, then the poison message is received by one thread within a particular component in step 302. A component which receives a poison message is again operating a plurality of threads as indicated at step 301 and thus the whole process loops round with poison messages causing multiples of the failed component to be instantiated in place of a single failing component.

This is best illustrated with an example in which a queue manager component is operating 100 threads.

In addition to the explanatory text provided as part of the graphical illustration below, additional detail will also follow at the end of the graphical illustration.

Queue Manager Component (QMC)
Thread 1
. . .
Thread N (gets poison message)
. . .
Thread 100

A QMC is a component of a queue manager such as a communication component 70.

Thus, it can be seen that QMC fails and is restarted as two instances having 50 threads each which are isolated from one another. Again, a poison message arrives at one of these threads causing the receiving QMC to fail.

Graphically this looks as follows:
QMC1
Thread 1
. . .
Thread N (gets poison message)
. . .
Thread 50
QMC2
Thread 1
. . .
Thread 50

As a result of the poison message, QMC1 fails, leaving QMC2 operating alone:
QMC2
Thread 1
. . .
Thread 50

QMC1 is then restarted as two processes (QMCs) with 25 threads each
QMC 1.1
Thread 1
. . .
Thread 25
QMC 1.2
Thread 1
. . .
Thread 25
QMC 2

Thread 1
...
Thread 50

Thus, the process continues. Each time a queue manager component receives a poison message, the queue manager instantiates a multiple of the failed component and preferably splits its original number of threads between the newly instantiated queue manager components.

In the example given, queue managers QMC 1.1 and QMC 1.2 are now less vulnerable to complete failure. Each time a queue manager component fails, the number of threads is split in half and shared between two instances of that component upon restart. Again, it will be appreciated that this is for exemplary purposes. Any number of components may be instantiated upon restart and any division of the original number of threads between these queue managers is possible. The queue manager may use a set of rules to help it determine how many components to instantiate and how to divide up the number of threads. Again, it should be appreciated that the threads that are created upon restart will not be the same threads that were previously in operation. Further, rules may define when to stop splitting a queue manager into a number of queue manager instances upon restart; for example, when the number of threads that can be divided between the new queue manager instances upon restart reaches a certain level (the minimum possible being one thread each).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

As discussed above, this division of threads is exemplary. Thus, the total number of threads allocated to the newly instantiated components may actually be more than the original number of threads allocated to the now failed component. The main point here is that each new instantiated component comprises a number of threads that is less than the number of threads allocated to the original component. In this way, the impact of a failure is minimized.

The advantage of such a setup is that a queue manager component becomes less vulnerable over time to a single point of failure.

Whilst the present invention has been described in terms of a messaging system, messages and a queue manager, where the queue manger component receives a poison message, the present invention is not intended to be limited to such. Rather the present invention is applicable to any component that is shared by multiple entities, where that shared component performs its work via a plurality of threads and attempting to process some invalid data causes the shared component and its plurality of threads to fail. It is the failure of these threads that causes multiple entities to be impacted. The solution presented herein addresses this issue.

It should be appreciated that an unhandled exception on a thread within a component will typically cause a system's operating system to stop all the other threads within that component. An unhandled exception occurs on a thread when during processing of a received message, an exception is thrown by the operating system which is not expected nor handled by the threads code (e.g., when the received message contains data which triggers a problem inside the thread).

Figure 4:
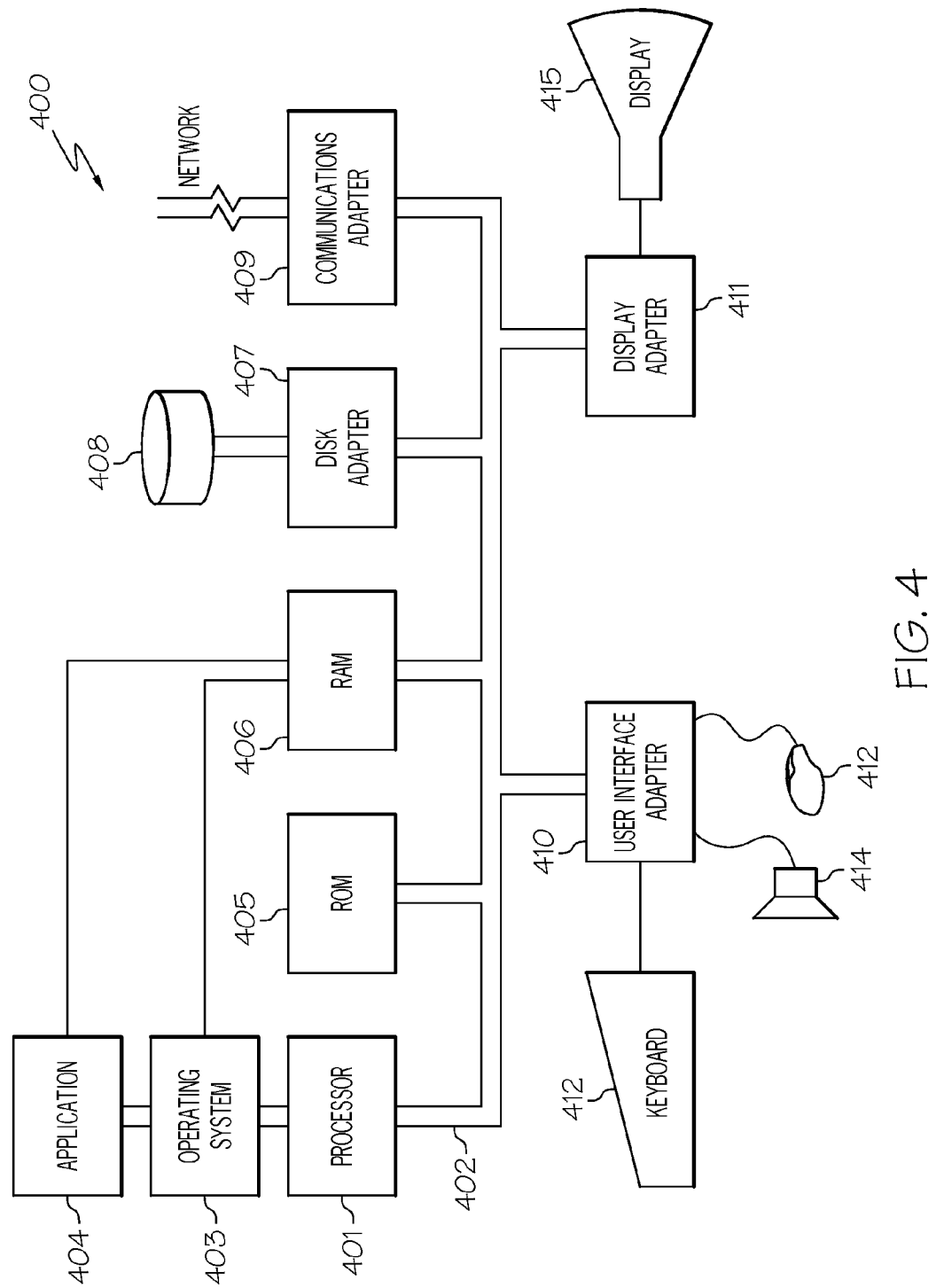
FIG. 4 depicts an embodiment of a hardware configuration of a computer system which is representative of a hardware environment for practicing the present invention.

FIG. 4 depicts an embodiment of a hardware configuration of a computer system 400 which is representative of a hardware environment for practicing the present invention. Referring to FIG. 4, computer system 400 has a processor 401 coupled to various other components by system bus 402. An operating system 403 may run on processor 401 and provide control and coordinate the functions of the various components of FIG. 4. An application 404 in accordance with the principles of the present invention may run in conjunction with operating system 403 and provide calls to operating system 403 where the calls implement the various functions or services to be performed by application 404. Application 404 may include, for example, an application for processing invalid data as discussed above.

Referring again to FIG. 4, read-only memory ("ROM") 405 may be coupled to system bus 402 and include a basic input/output system ("BIOS") that controls certain basic functions of computer device 400. Random access memory ("RAM") 406 and disk adapter 407 may also be coupled to system bus 402. It should be noted that software components including operating system 403 and application 404 may be loaded into RAM 406, which may be computer system's 400 main memory for execution. Disk adapter 407 may be an integrated drive electronics ("IDE") adapter that communicates with a disk unit 408, e.g., disk drive.

Computer system 400 may further include a communications adapter 409 coupled to bus 402. Communications adapter 409 may interconnect bus 402 with an outside network (not shown) thereby allowing computer system 400 to communicate with other similar devices.

I/O devices may also be connected to computer system 400 via a user interface adapter 410 and a display adapter 411. Keyboard 412, mouse 413 and speaker 414 may all be interconnected to bus 402 through user interface adapter 410. Data may be inputted to computer system 400 through any of these devices. A display monitor 415 may be connected to system bus 402 by display adapter 411. In this manner, a user is capable of inputting to computer system 400 through keyboard 412 or mouse 413 and receiving output from computer system 400 via display 415 or speaker 414.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Although the exemplary embodiments of the present invention have been illustrated and described above, the present invention is not limited to such embodiments. Those skilled in the art could make various variations, replacements and modifications under the teaching of the specification without departing from the scope and spirit of the present invention. It should be appreciated that, all these variations, replacements and modifications still fall within the scope of the present invention. The scope of the present invention is only defined by the attached claims.

The invention claimed is:

1. A method for processing invalid data, the method comprising:
   receiving data at a shared component for processing, the shared component having a plurality of threads;
   attempting to process the data using one thread from the plurality of threads, wherein the data is invalid and therefore the attempt at processing the invalid data results in the shared component and its plurality of threads failing, wherein the method further comprises:
   responsive to failure of the shared component, creating at least two instances of the shared component; and
   assigning, by a processor, at least one thread to each component instance, wherein a number of threads assigned to each component instance is restricted to a maximum number that is less than an original number of the plurality of threads.

2. The method as recited in claim 1, wherein the assigning of the at least one thread to each component instance comprises:
   assigning the number of threads to each component instance as a proportion of a number of threads originally allocated to the failed component.

3. The method as recited in claim 1 further comprising:
   using rules to determine how many instances of the shared component to create.

4. The method as recited in claim 1 further comprising:
   using rules to determine the number of threads to assign to each component instance.

5. The method as recited in claim 1 further comprising:
   determining that it is not appropriate to create any new instances of the shared component.

6. The method as recited in claim 1, wherein the shared component is a component of a queue manager in a messaging system.

7. A computer program product embodied in a computer readable storage medium for processing invalid data, the computer program product comprising the programming instructions for:
   receiving data at a shared component for processing, the shared component having a plurality of threads;
   attempting to process the data using one thread from the plurality of threads, wherein the data is invalid and therefore the attempt at processing the invalid data results in the shared component and its plurality of threads failing, wherein the method further comprises:
   responsive to failure of the shared component, creating at least two instances of the shared component; and
   assigning at least one thread to each component instance, wherein a number of threads assigned to each component instance is restricted to a maximum number that is less than an original number of the plurality of threads.

8. The computer program product as recited in claim 7, wherein the programming instructions for assigning of the at least one thread to each component instance comprises the programming instructions for:

assigning the number of threads to each component instance as a proportion of a number of threads originally allocated to the failed component.

9. The computer program product as recited in claim 7 further comprising the programming instructions for:
using rules to determine how many instances of the shared component to create.

10. The computer program product as recited in claim 7 further comprising the programming instructions for:
using rules to determine the number of threads to assign to each component instance.

11. The computer program product as recited in claim 7 further comprising the programming instructions for:
determining that it is not appropriate to create any new instances of the shared component.

12. The computer program product as recited in claim 7, wherein the shared component is a component of a queue manager in a messaging system.

13. A system, comprising:
a memory unit for storing a computer program for processing invalid data; and
a processor coupled to said memory unit, wherein said processor, responsive to said computer program, comprises
circuitry for receiving data at a shared component for processing, the shared component having a plurality of threads;
circuitry for attempting to process the data using one thread from the plurality of threads, wherein the data is invalid and therefore the attempt at processing the invalid data results in the shared component and its plurality of threads failing, wherein the method further comprises:
circuitry for responsive to failure of the shared component, creating at least two instances of the shared component; and
circuitry for assigning at least one thread to each component instance, wherein a number of threads assigned to each component instance is restricted to a maximum number that is less than an original number of the plurality of threads.

14. The system as recited in claim 13, wherein the circuitry for assigning of the at least one thread to each component instance comprises:
circuitry for assigning the number of threads to each component instance as a proportion of a number of threads originally allocated to the failed component.

15. The system as recited in claim 13, wherein said processor further comprises:
circuitry for using rules to determine how many instances of the shared component to create.

16. The system as recited in claim 13, wherein said processor further comprises:
circuitry for using rules to determine the number of threads to assign to each component instance.

17. The system as recited in claim 13, wherein said processor further comprises:
circuitry for determining that it is not appropriate to create any new instances of the shared component.

18. The system as recited in claim 13, wherein the shared component is a component of a queue manager in a messaging system.

* * * * *